US00RE50619E

(19) United States
(12) Reissued Patent
Lei

(10) Patent Number: US RE50,619 E
(45) Date of Reissued Patent: Oct. 7, 2025

(54) EMERGENCY POWER SOURCE

(71) Applicant: Shenzen Carku Technology Co., Ltd., Shenzhen (CN)

(72) Inventor: Xingliang Lei, Shenzhen (CN)

(73) Assignee: Shenzen Carku Technology Co., Ltd., Shenzhen (CN)

(21) Appl. No.: 16/858,190

(22) Filed: Apr. 24, 2020

Related U.S. Patent Documents

Reissue of:
(64) Patent No.: 9,954,391
Issued: Apr. 24, 2018
Appl. No.: 14/759,404
PCT Filed: Nov. 8, 2013
PCT No.: PCT/CN2013/086774
§ 371 (c)(1),
(2) Date: Jul. 6, 2015
PCT Pub. No.: WO2014/106407
PCT Pub. Date: Jul. 10, 2014

(30) Foreign Application Priority Data

Jan. 7, 2013 (CN) ..... 201310004817.1

(51) Int. Cl.
*H02J 7/00* (2006.01)
*B60L 8/00* (2006.01)
(Continued)

(52) U.S. Cl.
CPC ..... *B60L 8/003* (2013.01); *H02J 1/122* (2020.01); *H02J 9/04* (2013.01); *H02J 9/061* (2013.01); *Y02T 10/7072* (2013.01)

(58) Field of Classification Search
CPC ..... H02J 9/04; H02J 9/061; H02J 1/00; H02J 1/122; B60L 8/003; Y02T 10/7072
See application file for complete search history.

(56) References Cited

U.S. PATENT DOCUMENTS 2,659,042 A 11/1953 Anderson et al.
3,085,187 A 4/1963 Godshalk
(Continued)

FOREIGN PATENT DOCUMENTS

AU 2015258299 A1 12/2015
AU 2016392707 A1 11/2017
(Continued)

OTHER PUBLICATIONS

MC78XX/LM78XX/MC78XXA, 3-Terminal 1A Positive Voltage Regulator from Fairchild, Semiconductor Corporation 2001 ("LM7805 Datasheet").

(Continued)

*Primary Examiner* — Stephen J. Ralis
(74) *Attorney, Agent, or Firm* — Perkins Coie LLP

(57) ABSTRACT

An emergency power source comprises a housing. A battery pack (4) is arranged in the housing for storing electric energy. The input end of the battery pack (4) is connected to a charging circuit (1) for charging the battery pack (4) and the output end of a solar energy panel input circuit (2), the output end of the battery pack (4) is connected to a heavy-current output circuit (7) for outputting a heavy current when an automobile starts, and an external battery intelligent detection system (6) is connected between the battery pack (4) and the heavy-current output circuit (7). The emergency power source is convenient for charging, can output a heavy current for starting an automobile, and can also accurately control heavy-current output.

44 Claims, 5 Drawing Sheets

(51) Int. Cl.

| | |
|---|---|
| ***H02J 1/00*** | (2006.01) |
| ***H02J 1/10*** | (2006.01) |
| ***H02J 9/00*** | (2006.01) |
| ***H02J 9/04*** | (2006.01) |
| ***H02J 9/06*** | (2006.01) |

(56) References Cited

U.S. PATENT DOCUMENTS 3,105,183 A 9/1963 Hysler
3,267,452 A 8/1966 Wolf
3,343,057 A 9/1967 Smith
3,590,357 A 6/1971 Reid
3,933,140 A 1/1976 Gynn
3,950,688 A 4/1976 Sancey
4,041,445 A 8/1977 Carter
4,163,134 A 7/1979 Budrose
4,366,430 A 12/1982 Wright
4,463,402 A 7/1984 Cottrell
4,488,147 A 12/1984 Signorile
4,740,740 A 4/1988 Taranto et al.
4,769,586 A 9/1988 Kazmierowicz
4,871,957 A 10/1989 Taranto et al.
4,885,524 A 12/1989 Wilburn
4,910,628 A 3/1990 Minagawa et al.
4,931,731 A 6/1990 Jenks
4,972,135 A 11/1990 Bates et al.
4,990,723 A 2/1991 Ziberna et al.
5,083,076 A 1/1992 Scott
5,111,130 A 5/1992 Bates
5,189,359 A 2/1993 Kronberg
5,319,298 A 6/1994 Wanzong et al.
5,411,430 A 5/1995 Nishimura et al.
5,486,434 A 1/1996 Aoyama
5,489,359 A 2/1996 Yamane
5,496,658 A 3/1996 Hein
5,547,775 A 8/1996 Eguchi et al.
5,635,817 A 6/1997 Shiska
5,635,818 A 6/1997 Quintero
5,650,974 A 7/1997 Yoshimura
5,793,185 A 8/1998 Prelec et al.
5,795,182 A 8/1998 Jacob
5,796,255 A 8/1998 McGowan
5,820,407 A 10/1998 Morse
5,897,973 A 4/1999 Stephenson et al.
5,909,103 A 6/1999 Williams
5,921,809 A 7/1999 Fink
5,965,998 A 10/1999 Whiting et al.
6,002,235 A 12/1999 Clore
6,054,779 A 4/2000 Zubko
6,057,667 A 5/2000 Mills
6,130,519 A 10/2000 Whiting et al.
6,140,796 A 10/2000 Martin et al.
6,147,471 A 11/2000 Hunter
6,212,054 B1 4/2001 Chan
6,215,273 B1 * 4/2001 Shy ..... H02J 7/0042 320/105
6,222,342 B1 4/2001 Eggert et al.
6,262,492 B1 7/2001 Sheng
6,262,559 B1 7/2001 Eggert et al.
6,362,599 B1 3/2002 Turner et al.
6,386,907 B1 5/2002 Ruffa
6,424,158 B2 7/2002 Klang
6,426,606 B1 7/2002 Purkey
6,437,957 B1 8/2002 Karuppana et al.
6,632,103 B1 10/2003 Liu
6,648,701 B2 11/2003 Mouissie
6,679,708 B1 1/2004 Depp et al.
6,756,764 B2 6/2004 Smith et al.
6,803,743 B2 10/2004 George et al.
6,822,425 B2 * 11/2004 Krieger ..... H02J 7/007 320/137
7,095,339 B2 8/2006 Peng et al.
7,148,580 B2 12/2006 Sodemann et al.
7,301,303 B1 11/2007 Hulden
7,345,450 B2 3/2008 Krieger
7,363,129 B1 4/2008 Barniecle et al.
7,446,508 B2 11/2008 Aradachi et al.
7,508,165 B2 3/2009 Sobue et al.
7,514,900 B2 4/2009 Sander et al.
7,592,778 B2 9/2009 Ooshita et al.
7,609,031 B2 10/2009 Benckenstein et al.
7,749,031 B2 7/2010 Detter et al.
7,791,319 B2 9/2010 Veselic et al.
D625,265 S 10/2010 DuMelle et al.
7,847,520 B2 12/2010 Veselic et al.
7,868,582 B2 1/2011 Sander et al.
7,872,361 B2 1/2011 McFadden
7,969,119 B2 6/2011 Odaohhara
8,030,900 B2 10/2011 Hussain et al.
D649,116 S 11/2011 Nakatsuka
8,076,900 B1 12/2011 Brown
8,172,603 B1 5/2012 Richardet, Jr.
8,199,024 B2 6/2012 Baxter et al.
8,232,772 B2 7/2012 Lai
8,264,205 B2 9/2012 Kopera
8,376,775 B2 2/2013 Rinehardt
8,493,021 B2 7/2013 Richardson et al.
D689,020 S 9/2013 Demirjian et al.
8,686,688 B2 4/2014 Han et al.
8,786,247 B2 7/2014 Ishino et al.
8,975,870 B2 3/2015 Maruyama et al.
D726,109 S 4/2015 Nook et al.
D726,114 S 4/2015 Nook et al.
D726,121 S 4/2015 Nook et al.
9,007,015 B1 4/2015 Nook et al.
9,007,023 B2 4/2015 Dao
9,035,599 B2 5/2015 Amemiya et al.
9,041,244 B2 5/2015 Graf
D735,665 S 8/2015 Nook et al.
9,219,372 B2 12/2015 Paparrizos et al.
D746,774 S 1/2016 Nook et al.
9,245,888 B2 1/2016 Petruzzi
9,263,907 B2 2/2016 Richardson
9,391,467 B2 7/2016 Zhao et al.
9,506,446 B2 11/2016 Xinfang
9,718,419 B2 8/2017 Proebstle
9,770,992 B2 9/2017 Nook et al.
9,866,050 B2 1/2018 Brandt et al.
9,954,391 B2 4/2018 Lei
10,046,653 B2 8/2018 Wang et al.
10,141,755 B2 11/2018 Miller et al.
10,328,806 B2 6/2019 Wang et al.
10,328,808 B2 6/2019 Nook et al.
10,604,024 B2 3/2020 Nook et al.
11,104,236 B2 8/2021 Wang et al.
2002/0041174 A1 4/2002 Purkey
2002/0076997 A1 6/2002 Mouissie
2002/0121877 A1 9/2002 Smith
2003/0011344 A1 * 1/2003 Bertness ..... H02J 7/342 320/103
2003/0141845 A1 7/2003 Krieger
2003/0184264 A1 * 10/2003 Bertness ..... H02J 7/342 320/137
2004/0066168 A1 4/2004 George et al.
2004/0130298 A1 7/2004 Krieger et al.
2005/0040788 A1 2/2005 Tseng
2005/0082833 A1 4/2005 Sodemann
2005/0110467 A1 5/2005 Thomason
2005/0213867 A1 9/2005 Rajendran et al.
2005/0252573 A1 11/2005 Montani
2005/0258797 A1 11/2005 Hung
2006/0011615 A1 1/2006 Yamada
2006/0254806 A1 11/2006 White et al.
2007/0278990 A1 * 12/2007 Raichle ..... H02J 7/0031 320/104
2007/0285049 A1 12/2007 Krieger et al.
2008/0131764 A1 6/2008 Saiki
2008/0150473 A1 6/2008 Wise
2008/0257624 A1 * 10/2008 Kubo ..... B60L 58/26 180/68.1
2009/0174362 A1 7/2009 Richardson
2009/0218988 A1 * 9/2009 Richardson ..... H02J 7/00309 320/134
2009/0236859 A1 9/2009 McFadden

(56) References Cited

U.S. PATENT DOCUMENTS

| | | | | |
|---|---|---|---|---|
| 2009/0253312 | A1 | 10/2009 | Detter | |
| 2009/0296442 | A1* | 12/2009 | Chang | H02J 7/342 320/105 |
| 2009/0319209 | A1* | 12/2009 | Lim | G01R 31/3648 702/63 |
| 2010/0109607 | A1 | 5/2010 | Zheng et al. | |
| 2010/0173182 | A1 | 7/2010 | Baxter et al. | |
| 2010/0283623 | A1 | 11/2010 | Baxter et al. | |
| 2010/0301800 | A1 | 12/2010 | Inskeep | |
| 2011/0068734 | A1 | 3/2011 | Waldron | |
| 2011/0117408 | A1 | 5/2011 | Lennox | |
| 2011/0140651 | A1 | 6/2011 | Dai | |
| 2011/0174798 | A1* | 7/2011 | Madigan | A61H 19/00 126/263.01 |
| 2011/0291606 | A1* | 12/2011 | Lee | H02J 9/061 320/101 |
| 2012/0091944 | A1 | 4/2012 | Rogers | |
| 2012/0169116 | A1 | 7/2012 | Graf | |
| 2012/0228279 | A1* | 9/2012 | Haas | H05B 1/02 219/211 |
| 2012/0299533 | A1 | 11/2012 | Huffman et al. | |
| 2012/0319487 | A1 | 12/2012 | Shah | |
| 2013/0009782 | A1* | 1/2013 | Brandt | H01M 10/48 340/657 |
| 2013/0099736 | A1 | 4/2013 | Roberts | |
| 2013/0154543 | A1 | 6/2013 | Richardson et al. | |
| 2013/0171503 | A1* | 7/2013 | Lee | H01M 10/6555 429/150 |
| 2013/0241488 | A1 | 9/2013 | Dao | |
| 2013/0241498 | A1 | 9/2013 | Koebler | |
| 2013/0257388 | A1* | 10/2013 | Lee | H01M 50/20 320/152 |
| 2013/0260586 | A1 | 10/2013 | Higuchi | |
| 2013/0285596 | A1 | 10/2013 | Zhou et al. | |
| 2013/0314041 | A1 | 11/2013 | Proebstle | |
| 2013/0320960 | A1* | 12/2013 | Fosas | G01R 19/0092 324/120 |
| 2014/0113463 | A1 | 4/2014 | Peterson et al. | |
| 2014/0159509 | A1 | 6/2014 | Inskeep | |
| 2014/0343747 | A1* | 11/2014 | Culbertson | F01N 3/2013 700/300 |
| 2014/0368155 | A1 | 12/2014 | Chen | |
| 2015/0054336 | A1 | 2/2015 | Xinfang | |
| 2015/0054467 | A1 | 2/2015 | Takano | |
| 2015/0087182 | A1 | 3/2015 | Zhao et al. | |
| 2015/0137740 | A1 | 5/2015 | Allos | |
| 2015/0153416 | A1 | 6/2015 | Umemura | |
| 2015/0306964 | A1 | 10/2015 | Wang | |
| 2016/0001666 | A1 | 1/2016 | Nook et al. | |
| 2016/0036096 | A1 | 2/2016 | Yoshida | |
| 2016/0049819 | A1 | 2/2016 | Butler | |
| 2016/0181587 | A1 | 6/2016 | Koebler et al. | |
| 2016/0240834 | A1 | 8/2016 | Manka | |
| 2016/0268645 | A1 | 9/2016 | Koebler | |
| 2017/0334299 | A1 | 11/2017 | Chang | |
| 2018/0111491 | A1 | 4/2018 | Nook et al. | |
| 2018/0215274 | A1 | 8/2018 | Nook et al. | |
| 2018/0269703 | A1 | 9/2018 | Nook et al. | |
| 2018/0342891 | A1 | 11/2018 | Nook et al. | |
| 2018/0345803 | A1 | 12/2018 | Nook et al. | |
| 2019/0308518 | A1 | 10/2019 | Nook et al. | |

FOREIGN PATENT DOCUMENTS

| | | | | |
|---|---|---|---|---|
| AU | 2017217661 | B2 | 11/2018 | |
| AU | 2016269555 | B2 | 12/2018 | |
| AU | 2019201081 | A1 | 3/2019 | |
| AU | 2019201559 | A1 | 3/2019 | |
| CA | 2916782 | A1 | 1/2016 | |
| CA | 2957431 | A1 | 8/2017 | |
| CA | 3005971 | A1 | 8/2017 | |
| CN | 1049570 | A | 2/1991 | |
| CN | 1345476 | B | 4/2002 | |
| CN | 101548192 | A | 9/2009 | |
| CN | 201629693 | U | 11/2010 | |
| CN | 201750371 | U | 2/2011 | |
| CN | 201766385 | U | 3/2011 | |
| CN | 201781300 | U | 3/2011 | |
| CN | 202014108 | U | 10/2011 | |
| CN | 102496985 | A | 6/2012 | B60L 11/1818 |
| CN | 202275781 | U | 6/2012 | |
| CN | 202309139 | U | 7/2012 | |
| CN | 102651491 | A | 8/2012 | |
| CN | 102842935 | A | 12/2012 | |
| CN | 202651868 | U | 1/2013 | |
| CN | 202696190 | U | 3/2013 | |
| CN | 202918019 | U | 5/2013 | |
| CN | 203056633 | U | 7/2013 | |
| CN | 203211234 | | 9/2013 | |
| CN | 203504235 | | 10/2013 | |
| CN | 103560555 | A | 2/2014 | |
| CN | 203607878 | U | 5/2014 | |
| CN | 201420212173.5 | | 11/2014 | |
| CN | 104701820 | A | 6/2015 | |
| CN | 204559193 | U | 8/2015 | |
| CN | 204801694 | U | 11/2015 | |
| CN | 204905522 | U | 12/2015 | |
| CN | 105703415 | A | 6/2016 | |
| CN | 106505690 | A | 3/2017 | |
| CN | 107852004 | A | 3/2018 | |
| CN | 108884801 | A | 11/2018 | |
| DE | 29507501 | U1 | 6/1995 | |
| DE | 20 2009 016 260 | U1 | 3/2010 | |
| DE | 2020/13102599 | U1 | 8/2013 | |
| DE | 202015103173 | U1 | 8/2015 | |
| DE | 10 2014 114 997 | A1 | 1/2016 | |
| DE | 11 2016 002 206 | T5 | 3/2018 | |
| EP | 2472698 | A2 | 7/2012 | |
| EP | 2942852 | A1 | 11/2015 | |
| EP | 3308446 | A1 | 4/2018 | |
| EP | 3407405 | A1 | 11/2018 | |
| GB | 2527858 | A | 1/2016 | |
| GB | 2557733 | A | 6/2018 | |
| GB | 2562950 | A | 11/2018 | |
| JP | 3199301 | U | 8/2015 | |
| JP | 2018/534892 | A | 11/2018 | |
| JP | 2018/536789 | A | 12/2018 | |
| TW | M417714 | U1 | 12/2011 | |
| WO | WO-2004/036714 | A2 | 4/2004 | |
| WO | WO-2010/129723 | A2 | 11/2010 | |
| WO | WO-2012/074548 | | 6/2012 | |
| WO | WO-2012/080996 | A1 | 6/2012 | |
| WO | WO-2013/137873 | A1 | 9/2013 | |
| WO | WO-2016/003471 | A1 | 1/2016 | |
| WO | WO-2017/138963 | A1 | 8/2017 | |
| WO | WO-2017/139524 | A1 | 8/2017 | |

OTHER PUBLICATIONS

Holtek, HT75XX-1, 100mA Low Power LDO (Rev. 1.50 Jan. 12, 2006).

Datasheet for LM7805 Voltage Regulator from Fairchild Semiconductor, 2006.

AAA Batteries Pamphlet, 2008.

Stanley DPS109 Power Station Manual, 2010.

The Stanley Lithium-Ion Jump Starter (LI1000)—Instruction Manual, 2011.

Projecta, "2x22 Amp Hour High Performance Jumpstarter,": 1-20 (2012).

Carku Multi-Function-Starter-13200mAh, 2013.

Miscellaneous Carku Jump Starter Products, 2013-2014.

Petition for Inter Partes Review of U.S. Pat. No. 9,007,015, IPR2018-00503, filed Jan. 15, 2018 (49 pages).

Petition for Inter Partes Review of U.S. Pat. No. 9,007,015, IPR2020-00944, filed May 14, 2020 (105 pages).

Carku Product Brochure for the Epower-20 jump starter product ("Epower-20 brochure").

Carku Product Brochure for the Epower-21 jump starter product ("Epower-21 brochure").

(56) References Cited

OTHER PUBLICATIONS

Petition for Inter Partes Review of U.S. Pat. No. 9,007,015, IPR2020-01387, filed Jul. 29, 2020 (69 pages).
USB Battery Charging Specification Version 1.2.
Petition for Inter Partes Review of U.S. Pat. No. 9,007,015, IPR2021-00309, filed Dec. 11, 2020 (106 pages).
Hoque et al., Battery Charge Equalization Controller in Electric Vehicle Applications: A Review, Renewable and Sustainable Energy Reviews 75 (2017) 1363-85.
Ling et al., A Review of Equalization Topologies for Lithium-Ion Battery Packs, Proceedings of the 34th Chinese Control Conference (2015) 7922-27.
Universal Serial Bus Power Delivery Specification Rev. 1.0.
Carku Product Catalog, Shenzhen Carku Technology, Co. Ltd. 2013-14.
P.G. Balakrishnan et al., Safety mechanisms in lithium-ion batteries, Journal of Power Sources 155 (2006) 401-414, 14 pages.
"Electromechanical elementary relays: Part 1: General and safety requirements," International Standard, IEC 61810-1, Second Ed., Aug. 2003 (68 pages).
"Road vehicles—Electrical/electronic switching devices: Part 1: Relays and flashers," International Standard, ISO 7588-1, First Ed., Sep. 15, 1998 (9 pages).
"Road vehicles—60 V and 600 V single-core cables: Part 1: Dimensions, test methods and requirements for copper conductor cables," BSI Standards Publication, BS ISO 6722-1, Fourth Ed., Oct. 15, 2011 (52 pages).
"Battery Jumper cable set for road vehicles with combustion engines: dimensions, requirements, test," DIN 72 553, Apr. 1994, with English abstract machine translation (7 pages).

* cited by examiner (New, twice amended)

(New, twice amended)

EMERGENCY POWER SOURCE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is an application for reissue of U.S. Pat. No. 9,954,391, filed Jul. 6, 2015, which* is a U.S. national phase application of International Application No. PCT/CN2013/086774, filed with the State Intellectual Property Office of P. R. China on Nov. 8, 2013, which claims priority and benefit to Chinese Patent Application No. 201310004817.1, filed with the State Intellectual Property Office of P. R. China on Jan. 7, 2013, the entire content of *each of* which is incorporated herein by reference.

TECHNICAL FIELD

The present invention relates to the technical field of direct current power source, and more particularly, to an emergency power source for powering various types of devices.

BACKGROUND

With the development of technology and the improvement of people's living standard, cars, mobile phones, computers and digital cameras have been essential items for people's living, outing and travelling. These items are all battery-powered, and thus, they may completely lose their functionality when the power source is used up, and thus is inconvenient for people's life. Therefore, for each product, the manufacturer usually provides a corresponding charger to convert the 220V municipal electricity into a direct current power source of a voltage suitable to recharge the product, but this kind of charger can not meet outdoor recharging demands. For vehicles, it frequently occurs that the vehicle can not be started, especially for the vehicle in a travel trip, it may be difficult to get started due to insufficient power or low temperature, which is inconvenient for the users.

A prior Chinese patent document CN 101685974A discloses a mobile power having a battery pack, a charging circuit, a MCU micro controller circuit and a DC-DC voltage regulating output circuit. The charging circuit has an input terminal that may be connected to an external power source, and an output terminal of the charging circuit is electrically connected to the battery pack. Moreover, the battery pack is electrically connected to the MCU micro controller circuit and the DC-DC voltage regulating output circuit, the MCU micro controller circuit is electrically connected to the charging circuit and the DC-DC regulator output circuit and controls the two circuits. The above technical solution has the following advantages: simple circuit schematic, smaller size, light-weight for carrying, easy for controlling, intelligence, low power consumption and versatility, rechargeability using municipal electricity, capability of charging a variety of electronic products with different output conversion terminals or being charged by these electronic products, convenience for managing, carrying and use. The prior patent application solves the problem of outputting power under various voltage levels and having a recharging function, but it can not be used as the vehicle starter because it does not have the high-current outputting capability. In addition, the output current according to the above patent application document is direct current. But in practice, many external equipments need alternating current input, thus the prior patent application failed to solve the problem of powering such equipments in emergency.

SUMMARY

An objective of the present invention is to provide an emergency power source, which is easy to be recharged, to output a high current for starting a vehicle and accurately control the outputting of high current.

To achieve the above objective, the present invention uses the following technical solutions.

An emergency power source has a housing. The housing has at its inside a batter pack for storing electric energy. Input terminals of the battery pack are connected to output terminals of a charging circuit and a solar panel input circuit, output terminals of the battery pack are connected to a high current outputting circuit for outputting a high current used for starting a vehicle, and an external smart battery detection system is connected between the battery pack and the high current outputting circuit.

In certain embodiments, the battery pack consists of lithium-ion batteries connected in series or parallel, each battery having a positive electrode made of lithium iron phosphate, lithium cobalt oxide, nickel cobalt manganese ternary lithium or lithium manganate and a negative electrode made of artificial or natural graphite, the output terminal of the battery pack is further connected to a multipath DC-DC voltage regulator circuit and a LED driving circuit, each path of the DC-DC voltage regulator circuit is connected to a MCU controller circuit, and the MCU controller circuit is further connected to a smart LED electric quantity display system for displaying the electric quantity of the emergency power source, an output terminal of the LED driving circuit is connected to a LED lighting lamp, and an equalization protection circuit is connected in parallel with the battery pack for protecting the battery pack.

In certain embodiments, the external smart battery detection system includes a red power source clip and a black power source clip for connecting with an external battery, a relay switchable between an ON state and an OFF state according to a detection signal, a voltage identifying system for identifying the voltage of an external lead-acid battery or a lithium-ion starting battery, and a current identifying system for identifying a current flowing through an external starting circuit, two terminals of a coil of the relay are connected to the voltage identifying system, an input terminal of the relay is connected to the current identifying system, an output terminal of the relay is connected to the high current outputting circuit, the red and black power source clips are connected to the positive and negative electrodes of the battery pack through an reverse-insertion-proof connector or welded wires, the voltage identifying system is connected to the red and black power source clips, the relay is a 12V or 24V relay with a rating current ranging from 20 A to 300 A and 4 to 6 pins, the external smart battery detection system is either disposed outside the emergency power source and connected to the emergency power source through a reverse-insertion-proof connector, or disposed inside the emergency power source while the red and black power source clips is disposed outside the emergency power.

In certain embodiments, when the red and black power source clips are respectively connected to the positive and negative electrodes of the external battery, if the connection is correct, a feedback voltage displayed by the voltage identifying system is positive, otherwise the feedback voltage is negative; wherein the positive feedback voltage ranges from value a of 6 to 24 V to value b of 9 to 30 V and a is smaller than b; when the feedback voltage ranges from value a to value b and is of a positive value, the coil of the relay receives an electric signal so that its contact is closed and its output terminal is coupled to the input terminal of the high current outputting circuit so that the emergency power source starts to power an external device with a high current; then the current identifying system detects the current flowing through the high current outputting circuit, if the current is lower than value c, which ranges from 0.1 A to 10 A, the electrical signal across the coil of the relay disappears so that the contact is open, said output terminal is disconnected from the high current outputting circuit to stop powering the external device with the high current; and wherein the high current outputting circuit has an output voltage of 12V DC or 24V DC, and an instantaneous current ranging from 100 A to 600 A.

In certain embodiments, the DC-DC voltage regulator circuit includes a DC-DC 19V boost circuit having an output voltage of 19V, a DC-DC 12V output circuit having an output voltage of 12V, and a DC-DC 5V buck circuit having an output voltage of 5V.

In certain embodiments, an output terminal of the DC-DC 12V output circuit is connected to an alerting system for transmitting an alerting signal, an inverter circuit for converting electric energy outputted by the battery pack from direct current form to alternating current form, and a smart heating system for heating the battery pack.

In certain embodiments, the voltage of the alternating current electric energy outputted by the inverter circuit ranges from 110V to 220V, and the inverter circuit is either disposed inside the housing or external to the housing.

In certain embodiments, the smart heating system includes a heating wire or a heating sheet wrapped around the outside of the battery pack, a thermistor attached onto an outer surface of the battery pack and connected to the heating wire or the heating sheet, a heating starting switch for starting the smart heating system, the heating wire or the heating sheet having a resistance ranging from 0.1Ω to 10Ω; wherein an upper limit temperature t of a surface temperature of the battery pack is preset to range from 0° C. to 70° C., if the surface temperature of the battery pack fed back by the thermistor to the MCU controller circuit is lower than the upper limit temperature t, then the heating starting switch is switched on so that a heating current flows through the heating wire or heating sheet to heat the battery pack. The heating time is preset as a fixed value d ranging from 10 s to 300 s. If the surface temperature of the battery pack reaches the upper limit temperature t, the heating starting switch is automatically switched off, or if the heating time reaches value d, the heating circuit of the smarting heating system is automatically switched off.

In certain embodiments, the housing is made of plastic material, aluminum material or composite material, the solar panel input circuit is disposed on the outside of the housing, which has a power ranging from 0.5 W to 50 W and an input voltage ranging from 5V to 25V.

In certain embodiments, a disposable or recoverable fuse is further connected between the output terminal of the battery pack and the external smart battery detection system, which has a rating fusing current ranging from 50 A to 500 A.

In certain embodiments, a circuit of the current identifying system includes: a high-accuracy operational amplifier U3 whose model is SGM8591, resistors R12, R13, R14, R15, R16, R17, R18, R20, R21 and RS, capacitors C9 and C12, a switching diode D4 whose model is IN4148; and wherein pin 1 of U3 is floating, pin 2 of U3 is connected with a terminal of R16, a terminal of R15 and a terminal of R21, pin 3 of U3 is connected with a terminal of C12, a terminal of RS, and a negative electrode of BT2, pin 4 of U3 is grounded with a negative electrode of BT1 and the other terminal of RS, pin 5 of U3 is floating, pin 6 of U3 is connected with a terminal of R20, the other terminal of R21 and a positive electrode of D4, the other terminal of R20 is connected to the other terminal of C12, pin 7 of U3 is connected with terminal VCC and a terminal of C9, the other terminal of C9 is grounded, pin 8 of U3 is floating, a negative electrode of D4 is connected to a terminal of R17, the other terminal of R17 is connected with a terminal of R18 and terminal IN2, the other terminal of R18 is grounded, the other terminal of R15 is connected with a terminal of R12, a terminal of R13, and a terminal of R14.

In certain embodiments, a circuit of the voltage identifying system includes: a dual operational amplifier U2 whose model is LM358, a three-terminal voltage regulator circuit U1 whose model is 7805, resistors R1, R2, R4, R5, R6, R7, R8, R9, R10 and R11, capacitors C1, C2, C3, C4, C5, C6, C7 and C8, schottky diodes D1 and D2 whose model are SS14, and a three-terminal adjustable shunt voltage reference U4 whose model is TL431; and wherein pin 1 of U2 is connected with a terminal of R5, a terminal of C5 and a terminal of C4, the other terminal of R5 is connected with a terminal of R6 and terminal IN1, the other terminal of R6 is grounded, pin 2 of U2 is connected to pin 5 of U2, a terminal of R11, a negative electrode of U4, a reference electrode of U4, and the other terminal of R16, the other terminal of R11 is connected to terminal VCC, pin 3 of U2 is connected with the other terminal of C5, a terminal of R1, a terminal of R7 and a terminal of R8, the other terminal of R1 is connected to the other terminal of C4, pin 4 of U2 is grounded with the other terminal of R7, a positive electrode of U4 and a terminal of R9, the other terminal of R8 is connected with a negative electrode of D2 and a terminal of R10, a positive electrode of D2 is connected to a positive electrode of BT2, pin 6 of U2 is connected with the other terminal of R10, the other terminal of R9, a terminal of C6 and a terminal of R2, pin 7 of U2 is connected with the other terminal of C6, a terminal of C7 and a terminal of R4, the other terminal of R4 is connected to node A, the other terminal of C7 is connected to the other terminal of R2, pin 8 of U2 is connected with a terminal of C8, a terminal of C2, a terminal of C3, pin 3 of U1 and terminal VCC, the other terminal of C8 is grounded, the other terminal of C2 is grounded with the other terminal of C3, pin 1 of U1 is connected with a terminal of C1 and a negative electrode of D1, pin 2 of U1 is grounded with the other terminal of C1, a positive electrode of D1 is connected to the positive electrode of BT1.

In certain embodiments, a circuit of the relay includes: a three-terminal regulator chip U5 whose model is XC6219; resistors R3, R19 and R22; capacitors C11, C13 and C14; a schottky diode D5 whose model is SS14; a MCU controller chip J1; control switches Q1, Q2 and Q3 whose model are SI2300 and a relay; wherein pin 1 of U5 is connected with a terminal of C13, pin 3 of U5 and terminal VCC, pin 2 of U5 is grounded with the other terminal of C13, a terminal of C14, and pin 2 of J1, pin 4 of U5 is floating, pin 5 of U5 is connected with the other terminal of C14 and pin 1 of J1, pin 3 of J1 is connected to terminal IN1, pin 4 of J1 is connected to terminal OUT1, pin 5 of J1 is connected to terminal IN2, pin 6 of J1 is connected to terminal OUT2, pin 7 of J1 is floating, pin 8 of J1 is floating, terminal OUT1 is connected to a terminal of R3, the other terminal of R3 is connected to a gate of Q2, a drain of Q2 is connected to a source of Q3 and the other terminal of R13, a drain of Q3 is connected to the other terminal of R12, a gate of Q3 is connected to node A, a source of Q2 is connected with a source of Q1 and the other terminal of R14, a gate of Q1 is connected to a terminal of R19, the other terminal of R19 is connected to terminal OUT2, a drain of Q1 is connected with a positive electrode of D5 and a terminal of the coil of the relay, a negative electrode of D5 is connected with the other terminal of the coil of the relay, a terminal of a normally open contact of the relay, a terminal of R22, and a positive electrode of BT1, the other terminal of R22 is connected to a terminal of C11, the other terminal of C11 is connected with a terminal of the normally open contact of the relay and a positive electrode of BT2.

The present invention has the following advantages. The emergency power source of the present invention uses lithium-ion batteries as its battery pack, which have characteristics of light weight, small size, durability, high instantaneous discharging current and rechargeability, which can meet the demand of high current for starting a vehicle. By coupling an external smart battery detection system between the high current outputting circuit and the battery pack, the high current being supplied to external devices can be efficiently, accurately and reliably controlled. The battery pack of the emergency power source is also connected to a voltage regulator circuit for outputting a variety of voltage levels, and thus outdoor power demands of mobile phones, computers, digital cameras, car playing pumps, car refrigerators, car cleaners and so on can be satisfied by connecting the output terminal of the respective path of the voltage regulator circuit to the MCU controller circuit. The LED lighting lamp may provide outdoor lighting. The emergency power source itself may be charged by an external power source or solar energy, thereby the emergency power source can be automatically charged outdoors. In addition, the emergency power source has an alerting system, when the user is lost or some condition occurs, he or she can press on the start button of the alerting system to notice people around for help by activating a light or sound indicator of the alerting system. The emergency power source is also connected to the inverter circuit and the smart heating system, wherein the inverter circuit may convert electric energy in direct current form outputted by the battery pack into alternating current from, so that the power-shortage devices needing alternating current can be powered outdoors. The smart heating system has a heating wire or heating sheet and a thermal resistor, and may heat the battery pack of the power source under low environmental temperature to ensure normal working of the battery pack and provide electric energy. Moreover, the emergency power source has distinct red and black battery clips, which can effectively prevent reverse connection of the positive and negative electrodes when powering the external failure batteries, thereby are more convenient to the users.

In the above figures: 1—charging circuit; 2—solar panel input circuit; 3—equalization protection circuit; 4—battery pack; 5—fuse; 6—external smart battery detection system; 7—high current outputting circuit; 8—smart LED electric quantity display system; 9—DC-DC 5V buck circuit; 10—12V output circuit; 11—DC-DC 19V boost circuit; 12—LED driving circuit; 13—LED lighting lamp; 14—MCU controller circuit; 15—alerting system; 16—smart heating system; 17—inverter circuit; 61—circuit of voltage identifying system, 62—circuit of current identifying system; 63—circuit of relay*; 40A—heating wire; 40B—heating sheet; 45—thermistor; 48—heating starting switch; 50—housing.*

DETAILED DESCRIPTION

With reference to the accompanying drawings and specific embodiments, the present invention will be further described.

Figure 1:
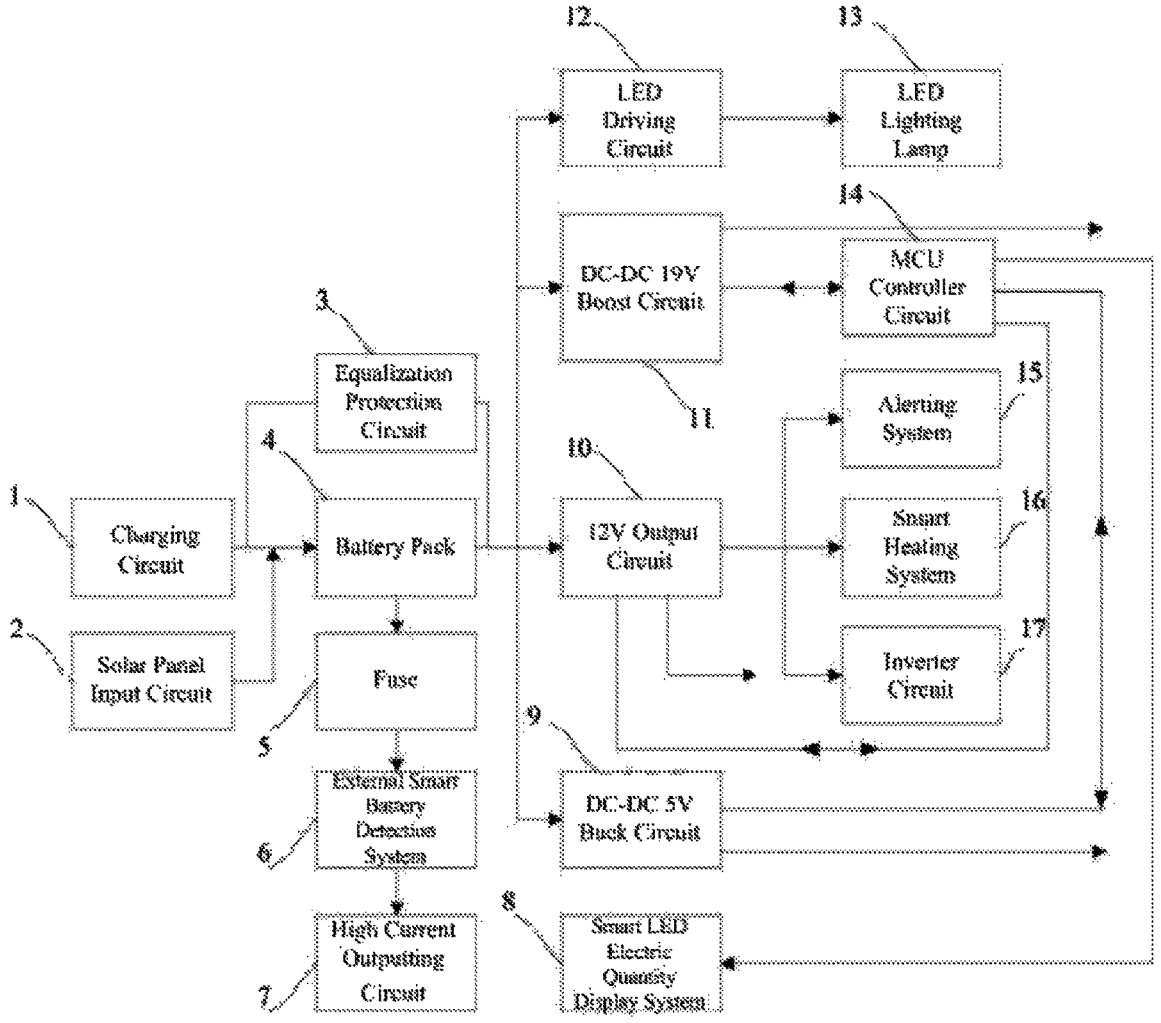
FIG. 1 is a block diagram of an emergency power source of the invention.
Figure 2:
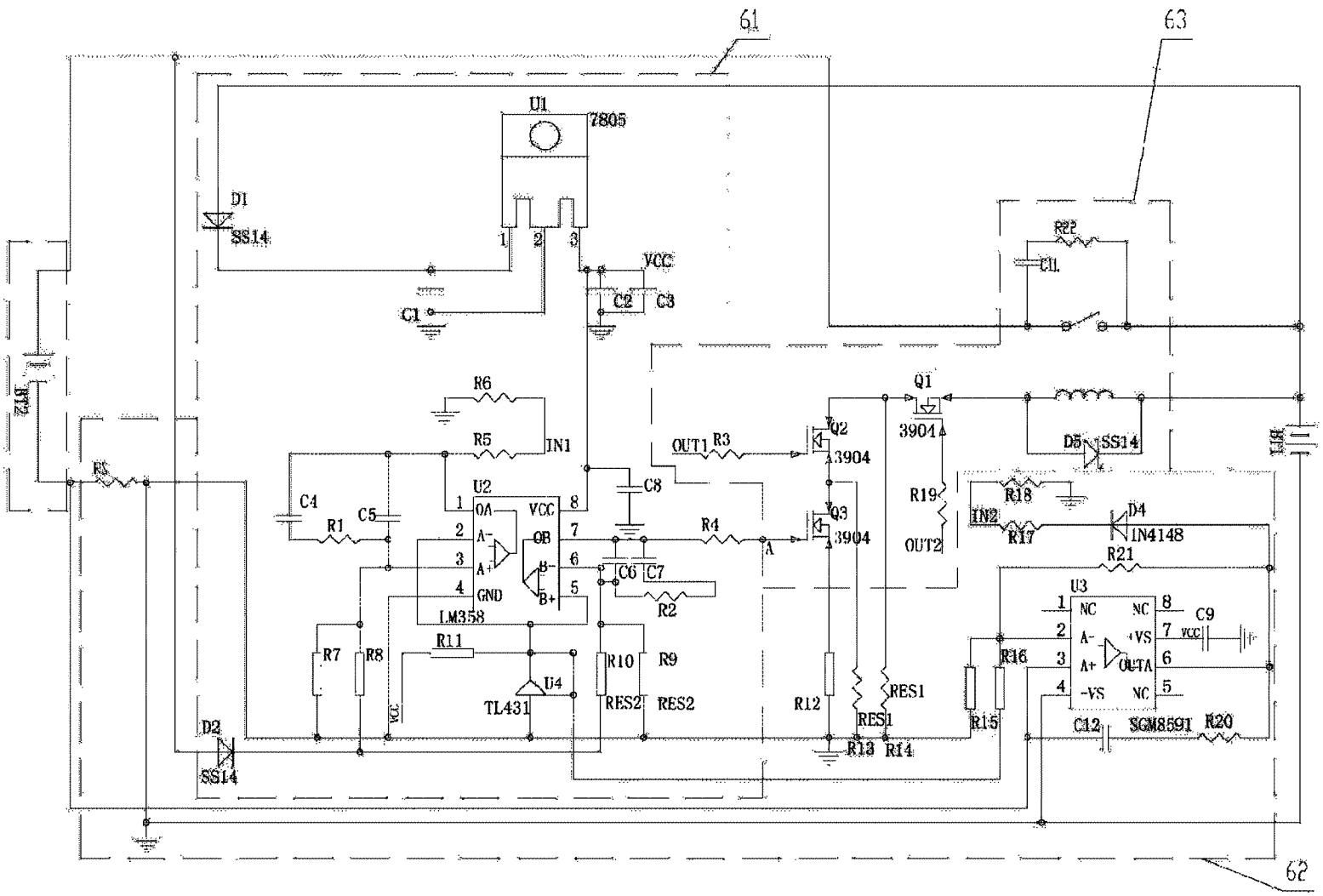
FIG. 2 is a first circuit diagram of an external smart battery detection system for an emergency power source of the invention.
Figure 3:
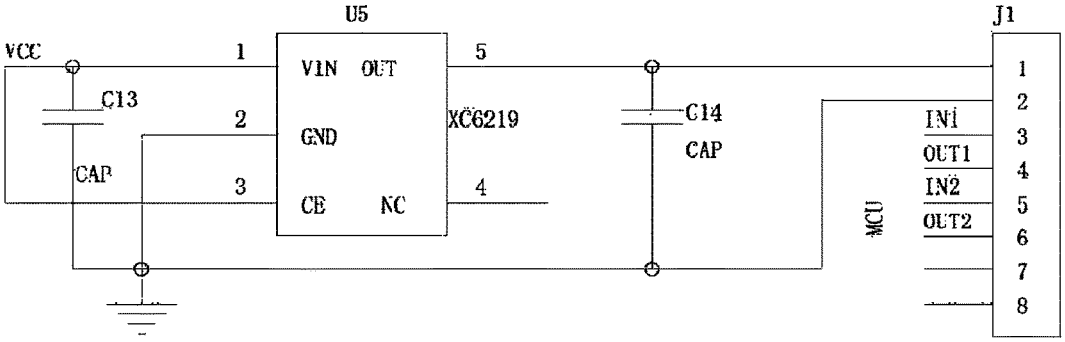
FIG. 3 is a second circuit diagram of an external smart battery detection system shown in FIG. 2.

As shown in FIGS. 1 to 3, an emergency power source includes a housing *50* having at its inside a battery pack 4 for storing electric energy. Input terminals of the battery pack 4 are connected to output terminals of a charging circuit 1 and a solar panel input circuit 2, output terminals of the battery pack 4 are connected to a high current outputting circuit 7 for outputting a high current used for starting a vehicle, and an external smart battery detection system 6 is connected between the battery pack 4 and the high current outputting circuit 7. Furthermore, the battery pack 4 consists of lithium-ion batteries connected in series or parallel, each having a positive electrode made of lithium iron phosphate, lithium cobalt oxide, nickel cobalt manganese ternary lithium or lithium manganate and a negative electrode made of artificial or natural graphite. The output terminals of the battery pack are further connected to a multipath DC-DC voltage regulator circuit and a LED driving circuit 12, each path of the DC-DC voltage regulator circuit is connected to a MCU controller circuit 14, and the MCU controller circuit 14 is further connected to a smart LED electric quantity display system 8 for displaying the electric quantity of the emergency power source, an output terminal of the LED driving circuit 12 is connected to a LED lighting lamp 13, and an equalization protection circuit 3 is connected in parallel with the battery pack 4 for protecting the battery pack 4. The DC-DC voltage regulator circuit includes a DC-DC 19V boost circuit 11 of an output voltage of 19V, a DC-DC 12V output circuit 10 of an output voltage of 12V, and a DC-DC 5V buck circuit 9 of an output voltage of 5V. In addition, the housing *50* of the emergency power source of the invention is made of plastic material, aluminum material or composite material. The solar panel input circuit 2 is disposed outside of the housing *50*, and has a power ranging from 0.5 W to 50 W and an input voltage ranging from 5V to 25V.

The emergency power source uses lithium-ion batteries as its battery pack, which has the characteristics of light weight, small size, durability, high instantaneous discharge current and rechargeability, which is capable of supplying a high current for starting a vehicle. By connecting the external smart battery detection system between the high current outputting circuit and the battery pack, the high current can be efficiently, accurately and reliably controlled, and the electric energy can be used more efficiently. The battery pack of the emergency power source is also connected to the voltage regulator circuit for outputting a variety of voltage levels, and by connecting the output terminal of the respective path of the voltage regulator circuit to the MCU controller circuit, various outdoor power demands of mobile phones, computers, digital cameras, car playing pumps, car refrigerators, car cleaners, etc. can be satisfied. The LED lighting lamp may provide outdoor lighting. Moreover, by a smart LED electric quantity display system 8, the power usage status of the battery pack 4 in the emergency power source can be detected in real time.

Figure 4A:
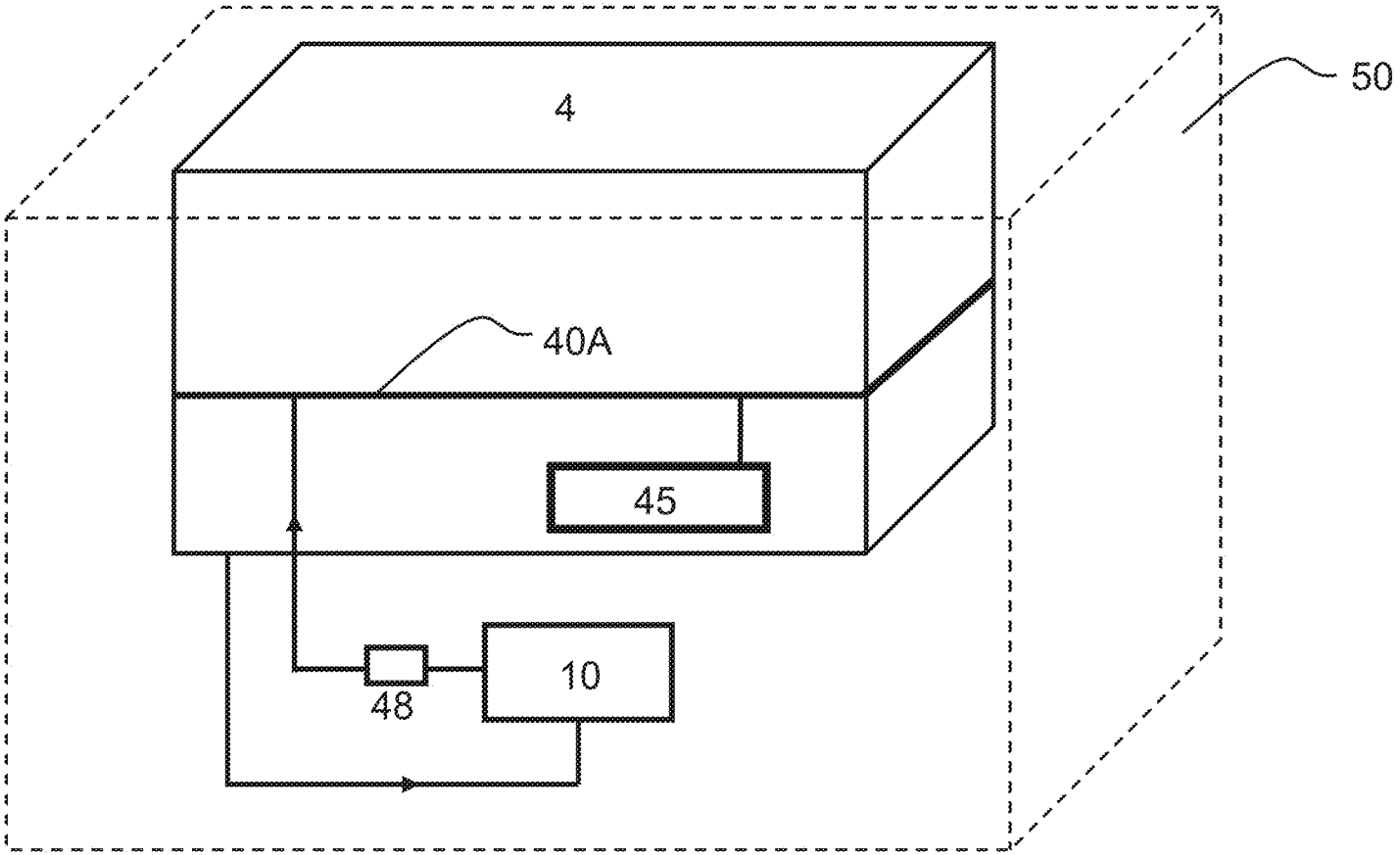
*FIGS. 4a and 4b show block diagrams of embodiments of a smart heating system of an emergency power source.*
Figure 4B:
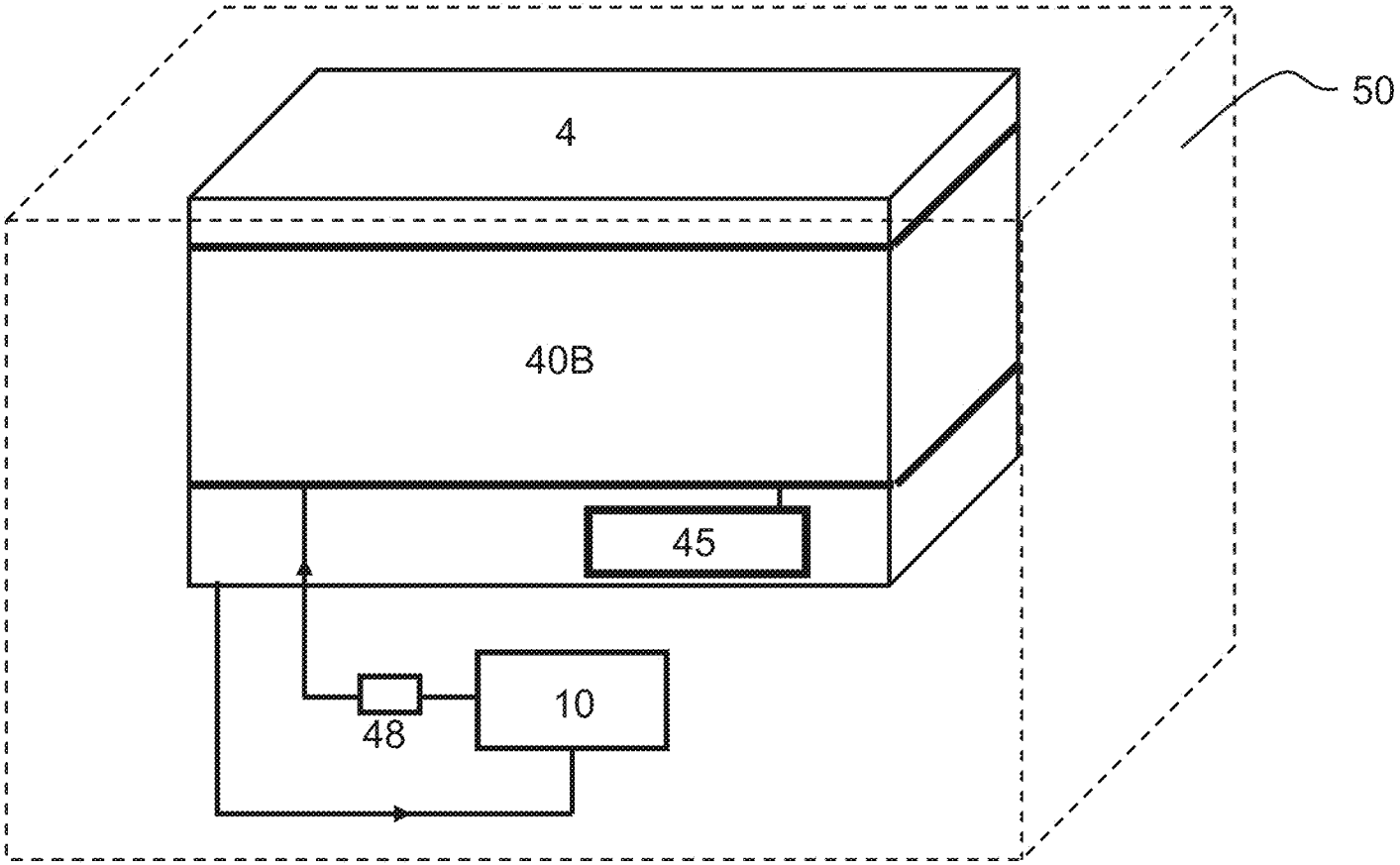

An output terminal of the DC-DC 12V output circuit 10 is connected to an alerting system 15 for transmitting an alerting signal, an inverter circuit 17 for converting electric energy outputted by the battery pack 4 from direct current form to alternating current form, and a smart heating system 16 for heating the battery pack 4. A start button of the alerting system 15 can be pressed by the user when he or she is lost or some condition occurs. The alerting system 15 may notice people around for help by lighting the indicator light or transmitting sounds with the alerting system 15. The voltage of the alternating current power outputted by the inverter circuit 17 ranges from 110V to 220V, which makes the emergency power source easy to be connected to external devices requiring alternating current power, and the voltage matches with the demand and no regulation is needed. Thus, the external devices may be powered outdoors under power shortage situation, to ensure the normal working of such devices. The inverter circuit 17 may be disposed inside the housing *50*, or a connector for connecting the inverter circuit 17 may be provided on the housing *50*. When there is a need for alternating current power supplying, the external inverter can be directly connected to the connector to satisfy the demand for converting direct current form into alternating current form, and the operation is convenient. In addition, *as illustrated in FIGS. 4A and 4B,* the smart heating system 16 includes a heating wire *40A* or a heating sheet *40B* wrapped around the outside of the battery pack 4, a thermistor *45* attached onto an outer surface of the battery pack 4 and connected to the heating wire *40A* or the heating sheet *40B*, and a heating starting switch *48* for starting the smart heating system *16*. The heating wire *40A* or the heating sheet *40B* has a resistance ranging from 0.1Ω to 10Ω. When being used, an upper limit temperature t of a surface temperature of the battery pack 4 is preset to range from 0° C. to 70° C. If the external environment temperature is low and affects the normal working of the power source, then the heating starting switch *48* is switched on. If the surface temperature of the battery pack 4 fed back by the thermistor *45* to the MCU controller circuit 14 is lower than t, then the heating starting switch *48* controlling the heating of the heating wire *40A* or the heating sheet *40B* is switched on so that a heating current flows through the heating wire *40A* or the heating sheet *40B*, the smart heating system 16 begins to heat the battery pack 4. Before heating, a heating time is preset as a fixed value d ranging from 10 s to 300 s. During the heating process, when the surface temperature of the battery pack 4 reaches the upper limit temperature t, the heating starting switch *48* controlling the heating wire *40A* or the heating sheet *40B* will be automatically switched off, cutting off the current flowing through the heating wire *40A* or the heating sheet *40B*. Alternatively, when the heating time reaches value d, the heating circuit of the smart heating system 16 will be automatically switched off to stop heating the battery pack. The smart heating system 16 accurately controls the ON state and OFF state of the heating circuit of the smart heating system 16 using the thermal sensitive property of the thermistor *48*, thereby improving the heating efficiency and reducing the power consumption of the heating. With the smart heating system 16, the emergency power source may ensure the normal working of the battery pack and supplying external devices under low environmental temperature that may affect normal working of the power sources. Thus, the reliability of the entire system is improved.

The external smart battery detection system 6 includes a red power source clip and a black power source clip for connecting with an external battery, a relay switchable between an ON state and an OFF state according to a detection signal, a voltage identifying system for identifying the voltage of an external lead-acid battery or a lithium-ion starting battery, and a current identifying system for identifying a current flowing through an external starting circuit. The voltage identifying system is connected between two terminals of a coil of the relay, an input terminal of the relay is connected to the current identifying system, an output terminal of the relay is connected to the high current outputting circuit 7, the red and black power source clips are connected to the battery pack through an anti-reverse connector connected to the positive and negative electrodes of the battery pack 4 or conducting wires welded to the positive and negative electrodes of the battery pack 4. If the red and black power source clips are connected to an insertable anti-reverse connector such that the voltage identifying system is connected to the red and black power source clips. The relay of the emergency power source of the invention is a 12V or 24V relay with a rating current ranging from 20 A to 300 A and 4 to 6 pins. The external smart battery detection system 6 is disposed outside the emergency power source and connected to the emergency power source through an anti-reverse connector, or is disposed inside the emergency power source with the red and black power source clips disposed outside the emergency power. Preferably, in certain embodiments of the invention, the external battery detection system 6 is disposed inside the emergency power source with the red and black power source clips disposed outside the emergency power source. The red and black power source clips and the battery pack 4 are connected with each other by silicone wire or other wires, to connect with the external devices. Reverse connection or short-circuit condition caused by the contact of the red and black power source clip can be avoided by connecting the red and black power source clips to the external batteries.

When the red and black power source clips are respectively connected to the positive and negative electrodes of the external battery, if the connection is correct, a feedback voltage displayed by the voltage identifying system is positive, otherwise the feedback voltage is negative. The positive feedback voltage ranges from value a of 6 to 24 V to value b of 9 to 30 V, and a is smaller than b. If the connection is reverse, the relay does not work, and the high current outputting circuit 7 may be cut off. If the external smart battery detection system 6 fails, to further ensure the safety of the emergency power source, in the circuit of the emergency power source of the invention, a disposable or recoverable fuse 5 is provided and is connected between the output terminals of the battery pack 4 and the external smart battery detection system 6. The fuse 5 has a rating fusing current ranging from 50 A to 500 A. To ensure the safety of charging or discharging the battery pack 4, an equalization protection circuit 3 is connected in parallel with the battery pack 4, providing over-current, overload, overcharging or over-discharging protection for the battery pack 4.

In this invention, when the feedback voltage ranges from value a to value b and is of a positive value, the coil of the relay receives a voltage signal so that its contact is closed and its output terminal is coupled to the high current outputting circuit 7, and the emergency power source starts to power an external device with a high current. At this time, the current identifying system detects the current flowing through the high current outputting circuit 7. If the current is lower than value c, which ranges from 0.1 A to 10 A, the voltage signal across the coil of the relay disappears, the contact is then open, thus its output terminal is disconnected from the high current outputting circuit 7 to stop powering the external device with the high current. The high current outputting circuit 7 has an output voltage of 12V DC or 24V DC, and an instantaneous current ranging from 100 A to 600 A, which can be used as a starting power source for vehicles in emergency. Powering the external device with the high current can be efficiently, accurately and reliably controlled, and the electric energy can be efficiently used by connecting the external smart battery detection system 6 between the high current outputting circuit 7 and the battery pack 4. The external smart battery detection system 6 can be disposed inside the housing *50* or external to the housing *50*.

FIGS. 2 and 3 show a circuit diagram of the external smart battery detection system 6. BT1 is a rechargeable battery, which is the battery pack 4 in FIG. 1, and BT2 is a vehicle battery to be charged.

Specifically, a circuit 62 of the current identifying system includes: a high-accuracy operational amplifier U3 whose model is SGM8591, resistors R12, R13, R14, R15, R16, R17, R18, R20, R21 and RS, capacitors C9 and C12, a switching diode D4 whose model is IN4148; and wherein pin 1 of U3 is floating, pin 2 of U3 is connected with a terminal of R16, a terminal of R15 and a terminal of R21, pin 3 of U3 is connected with a terminal of C12, a terminal of RS, and a negative electrode of BT2, pin 4 of U3 is grounded with a negative electrode of BT1 and the other terminal of RS, pin 5 of U3 is floating, pin 6 of U3 is connected with a terminal of R20, the other terminal of R21 and a positive electrode of D4, the other terminal of R20 is connected to the other terminal of C12, pin 7 of U3 is connected with terminal VCC and a terminal of C9, the other terminal of C9 is grounded, pin 8 of U3 is floating, a negative electrode of D4 is connected to a terminal of R17, the other terminal of R17 is connected with a terminal of R18 and terminal IN2, the other terminal of R18 is grounded, the other terminal of R15 is connected with a terminal of R12, a terminal of R13, and a terminal of R14.

Specifically, the circuit 61 of the voltage identifying system includes: a dual operational amplifier U2 whose model is LM358, a three-terminal voltage regulator circuit U1 whose model is a 7805, resistors R1, R2, R4, R5, R6, R7, R8, R9, R10 and R11, capacitors C1, C2, C3, C4, C5, C6, C7 and C8, schottky diodes D1 and D2 whose model are SS14, and a three-terminal adjustable shunt voltage reference U4 whose model is TL431; and wherein pin 1 of U2 is connected with a terminal of R5, a terminal of C5 and a terminal of C4, the other terminal of R5 is connected with a terminal of R6 and terminal IN1, the other terminal of R6 is grounded, pin 2 of U2 is connected to pin 5 of U2, a terminal of R11, a negative electrode of U4, a reference electrode of U4, and the other terminal of R16, the other terminal of R11 is connected to terminal VCC, pin 3 of U2 is connected with the other terminal of C5, a terminal of R1, a terminal of R7 and a terminal of R8, the other terminal of R1 is connected to the other terminal of C4, pin 4 of U2 is grounded with the other terminal of R7, a positive electrode of U4 and a terminal of R9, the other terminal of R8 is connected with a negative electrode of D2 and a terminal of R10, a positive electrode of D2 is connected to a positive electrode of BT2, pin 6 of U2 is connected with the other terminal of R10, the other terminal of R9, a terminal of C6 and a terminal of R2, pin 7 of U2 is connected with the other terminal of C6, a terminal of C7 and a terminal of R4, the other terminal of R4 is connected to node A, the other terminal of C7 is connected to the other terminal of R2, pin 8 of U2 is connected with a terminal of C8, a terminal of C2, a terminal of C3, pin 3 of U1 and terminal VCC, the other terminal of C8 is grounded, the other terminal of C2 is grounded with the other terminal of C3, pin 1 of U1 is connected with a terminal of C1 and a negative electrode of D1, pin 2 of U1 is grounded with the other terminal of C1, a positive electrode of D1 is connected to the positive electrode of BT1.

Specifically, the circuit 63 of the relay includes: a three-terminal regulator chip U5 whose model is XC6219; resistors R3, R19 and R22; capacitors C11, C13 and C14; a schottky diode D5 whose model is SS14; a MCU controller chip J1; control switches Q1, Q2 and Q3 whose model are SI2300 and a relay; wherein pin 1 of U5 is connected with a terminal of C13, pin 3 of U5, terminal VCC, pin 2 of U5 is grounded with the other terminal of C13, a terminal of C14, and pin 2 of J1, pin 4 of U5 is floating, pin 5 of U5 is connected with the other terminal of C14 and pin 1 of J1, pin 3 of J1 is connected to terminal IN1, pin 4 of J1 is connected to terminal OUT1, pin 5 of J1 is connected to terminal IN2, pin 6 of J1 is connected to terminal OUT2, pin 7 of J1 is floating, pin 8 of J1 is floating, terminal OUT1 is connected to a terminal of R3, the other terminal of R3 is connected to a gate of Q2, a drain of Q2 is connected to a source of Q3 and the other terminal of R13, a drain of Q3 is connected to the other terminal of R12, a gate of Q3 is connected to node A, a source of Q2 is connected with a source of Q1 and the other terminal of R14, a gate of Q1 is connected to a terminal of R19, the other terminal of R19 is connected to terminal OUT2, a drain of Q1 is connected with a positive electrode of D5 and a terminal of the coil of the relay, a negative electrode of D5 is connected with the other terminal of the coil of the relay, a terminal of a normally open contact of the relay, a terminal of R22, and a positive electrode of BT1, the other terminal of R22 is connected to a terminal of C11, the other terminal of C11 is connected with a terminal of the normally open contact of the relay and a positive electrode of BT2.

When the emergency power source is disconnected from the external rechargeable battery, or the current is smaller than the preset current value, R15 and R16 in the circuit 62 of the current identifying system provide a detection signal to U3. Then U3 sends an output signal to the MCU controller chip according to the detection signal, based on which the MCU controller chip may determine the ON or OFF state of the circuit to make proper instructions. When the preset voltage value is 8.1V and the output voltage value is smaller than the preset value, R7 and R8 of the circuit 61 of the voltage identifying system may provide a detection signal to U2, and U2 may send an output signal to terminal IN1 according to the detection signal. Then the MCU controller chip further controls the control switch Q2 in the circuit 63 of the relay according to the signal from terminal IN1. When the output voltage is bigger than a preset value, which may be 12.6V in the invention, R9 and R10 of the circuit 61 of the voltage identifying system may provide a detection signal to U2, and U2 may send a signal according to the detection signal to control the control switch Q3 in the circuit 63 of the relay. In this invention, the circuit 61 of the voltage identifying system and the circuit 62 of the current identifying system co-operate to provide the signal to the MCU controller chip. With the determination of the MCU controller chip, the switches Q1, Q2 and Q3 in the circuit 63 of the [replay] *relay* can be controlled to achieve charging and protecting.

The foregoing are merely preferred embodiments of the present invention, which is not intended to limit the invention. For a person skilled in the art, various modifications and variations can be made to the present invention. Any modifications, equivalents and improvements within the spirit and principle of the present invention should be included within the scope of the present invention.

What is claimed is:

1. An emergency power source comprising a housing, said housing having at its inside [a batter pack (4) for storing] *battery pack configured to store* electric energy, wherein input terminals of the battery pack [(4)] are *configured to be* connected to output terminals of a charging circuit [(1) and] *for receiving the electric energy from an external power source and to output terminals of* a solar panel input circuit [(2),] *disposed outside of the housing for receiving the electric energy from solar energy, and wherein* output terminals of the battery pack [(4)] are connected to a high current outputting circuit [(7) for outputting] *configured to output* a high current [used] for starting a vehicle,

[an external] *a* smart battery detection system [(6) is] connected between the battery pack [(4)] and the high current outputting circuit [(7)], the [external] smart battery detection system [(6) comprises] *comprising* a red power source clip and a black power source clip [for connecting with an external] *configured to be connected with a vehicle* battery *of the vehicle*,

[a relay switchable between an ON state and an OFF state according to a detection signal,]

a voltage identifying system *comprising a circuit* for identifying [the] *a* voltage of [an external lead-acid] *the vehicle* battery or [a lithium-ion starting battery, and]*the battery pack, wherein the circuit of the voltage identifying system comprises a first amplifier,* a current identifying system *comprising a circuit* for identifying a current flowing through an external starting circuit, *wherein the circuit of the current identifying system comprises a second amplifier, and*

*a relay switchable between an ON state and an OFF state according to a detection signal that relates to the identified voltage or the identified current, the relay comprising a coil,* wherein two terminals of [a] *the* coil of the relay are connected to the voltage identifying system, *one of the two terminals of the coil is directly connected to an electrode of the battery pack,* an input terminal of the relay is connected to the current identifying system, an output terminal of the relay is connected to the high current outputting circuit [(7)], the red and black power source clips are connected to [the] positive and negative electrodes of the battery pack [(4)] through a reverse-insertion-proof connector or welded wires, the voltage identifying system is connected to the red and black power source clips.

2. The emergency power source according to claim 1, wherein the relay is a 12V or 24V relay with a rating current ranging from 20 A to 300 A [and 4 to 6 pins, the external smart battery detection system (6) is either disposed outside the emergency power source and connected to the emergency power source through a reverse-insertion-proof connector, or disposed inside the emergency power source while the red and black power source clip is disposed outside the emergency power source].

3. The emergency power source according to claim 2, wherein when the red and black power source clips are respectively connected to [the] positive and negative electrodes of the [external] *vehicle* battery, [if] *the voltage identifying system is configured to detect whether* the connection is correct[, a feedback voltage displayed by the voltage identifying system is positive, otherwise the feedback voltage is negative; wherein the positive feedback voltage ranges from value a of 6 to 24 V to value b of 9 to 30 V, and a is smaller than b;

when the feedback voltage ranges from value a to value b and is of a positive value, the coil of the relay receives an electric signal so that its contact is closed and its output terminal is coupled to the input terminal of the high current outputting circuit, the high current outputting circuit (7) is switched on, and the emergency power source starts to power an external device with a high current; then the current identifying system detects the current flowing through the high current outputting circuit (7), if the current is lower than value c, which ranges from 0.1 A to 10 A, the electrical signal across the coil of the relay disappears so that the contact is open, said output terminal is disconnected from the high current outputting circuit to stop powering the external device with the high current; and wherein the high current outputting circuit (7) has an output voltage of 12V DC or 24V DC, and an instantaneous current ranging from 100 A to 600 A].

4. An emergency power source comprising a housing, said housing having at its inside a [batter pack (4) for storing] *battery pack configured to store* electric energy, wherein input terminals of the battery pack [(4)] are *configured to be* connected to output terminals of acharging circuit [(1)] and a solar panel input circuit [(2)] *disposed outside of the housing*, output terminals of the battery pack [(4)] are *configured to be* connected to a high current outputting circuit [(7)] for outputting a high current [used] for starting a vehicle,

[an external] *a* smart battery detection system [(6) is] connected between the battery pack [(4)] and the high current outputting circuit [(7)], *the smart battery detection system comprising:*

*a red power source clip and a black power source clip configured to be connected with a vehicle battery of the vehicle,*

*a voltage identifying system comprising a circuit configured to identify a voltage of the vehicle battery,*

*a current identifying system comprising a circuit configured to identify a current flowing through an external starting circuit, wherein the circuit of the current identifying system comprises an amplifier, and*

*a relay switchable between an ON state and an OFF state according to a detection signal that relates to the identified voltage or the identified current,*

*wherein two terminals of the relay are connected to the voltage identifying system, one of the two terminals of a coil of the relay is directly connected to an electrode of the battery pack, an input terminal of the relay is connected to the current*

*identifying system, an output terminal of the relay is connected to the high current outputting circuit, wherein the red and black power source clips are connected to positive and negative electrodes of the battery pack, the voltage identifying system is connected to the red and black power source clips,*

*wherein* the output terminals of the battery pack are further connected to a multipath DC-DC voltage regulator circuit comprising*:* a DC-DC [19V] boost circuit [(11) having] *outputting* an output voltage [of 19V]*boosted to be higher than a voltage from the battery pack*, a DC-DC [12V] output circuit [(10) having] *outputting* an output voltage [of 12V] *associated with a voltage of the battery pack*, and a DC-DC [5V] buck circuit [(9) having] *outputting* an output voltage [of 5V] *lower than a voltage of the battery pack*, *and*

*wherein* an output terminal of the DC-DC [12V] output circuit [(10)] is connected to an alerting system [(15)] for transmitting an alerting signal, an inverter circuit [(17)] for converting electric energy outputted by the battery pack [(4)] from direct current to alternating current, and a smart heating system [(16)] for heating the battery pack [(4)]. *wherein the smart heating system comprises a heating wire or a heating sheet.*

5. The emergency power source according to claim 4, wherein the battery pack [(4)] consists of lithium-ion batteries connected in series or parallel[, each battery having a positive electrode made of lithium iron phosphate, lithium cobalt oxide, nickel cobalt manganese ternary lithium or lithium manganate and a negative electrode made of artificial or natural graphite, the output terminals of the battery pack are further connected to a LED driving circuit (12), each path of the DC-DC voltage regulator circuit is connected to a MCU controller circuit (14), and the MCU controller circuit (14) is further connected to a smart LED electric quantity display system (8) for displaying the electric quantity of the emergency power source, an output terminal of the LED driving circuit (12) is connected to a LED lighting lamp (13), and an equalization protection circuit (3) is connected in parallel with the battery pack (4) for protecting the battery pack (4)].

6. The emergency power source according to [claim 5] *claim 4*, wherein [the] *a* voltage of the alternating current electric energy outputted by the inverter circuit [(17)] ranges from 110V to 220V[, and the inverter circuit (17) is either disposed inside the housing or external to the housing].

7. The emergency power source according to [claim 5] *claim 4*, wherein the smart heating system [(16)] comprises

[a] *the* heating wire or [a] *the* heating sheet wrapped around the outside of the battery pack [(4)], a thermistor attached onto an outer surface of the battery pack [(4)] and connected to the heating wire or the heating sheet, *and* a heating starting switch for starting the smart heating system [(16), wherein the heating wire or the heating sheet has a resistance ranging from 0.1Ω to 10Ω;

wherein an upper limit temperature t of a surface temperature of the battery pack (4) is preset to range from 0° C. to 70° C., if the surface temperature of the battery pack (4) fed back by the thermistor to the MCU controller circuit (14) is lower than the upper limit temperature t, then the heating starting switch is switched on so that a heating current flows through the heating wire or heating sheet to heat the battery pack (4); a heating time is preset as a fixed value d ranging from 10 s to 300 s, if the surface temperature of the battery pack (4) reaches the upper limit temperature t, the heating starting switch is automatically switched off, or if the heating time reaches value d, the heating circuit of the smarting heating system is automatically switched off].

[8. The emergency power source according to claim 1, wherein the housing is made of plastic material, aluminum material or composite material, the solar panel input circuit (2), which is disposed on the outside of the housing, has a power ranging from 0.5 W to 50 W and an input voltage ranging from 5V to 25V.]

9. The emergency power source according to claim 1, [wherein a disposable or recoverable] *further comprising a* fuse [(5) is further connected] between *one of* the output [terminal] *terminal* of the battery pack [(4)] and the [external] smart battery detection system [ (6), said fuse has a rating fusing current ranging from 50 A to 500 A].

[10. The emergency power source according to claim 2, wherein a circuit (62) of the current identifying system comprises:

a high-accuracy operational amplifier U3 whose model is SGM8591, resistors R12, R13, R14, R15, R16, R17, R18, R20, R21 and RS, capacitors C9 and C12, a switching diode D4 whose model is IN4148; and wherein pin 1 of U3 is floating, pin 2 of U3 is connected with a terminal of R16, a terminal of R15 and a terminal of R21, pin 3 of U3 is connected with a terminal of C12, a terminal of RS, and a negative electrode of BT2, pin 4 of U3 is grounded with a negative electrode of BT1 and the other terminal of RS, pin 5 of U3 is floating, pin 6 of U3 is connected with a terminal of R20, the other terminal of R21 and a positive electrode of D4, the other terminal of R20 is connected to the other terminal of C12, pin 7 of U3 is connected with terminal VCC and a terminal of C9, the other terminal of C9 is grounded, pin 8 of U3 is floating, a negative electrode of D4 is connected to a terminal of R17, the other terminal of R17 is connected with a terminal of R18 and terminal IN2, the other terminal of R18 is grounded, the other terminal of R15 is connected with a terminal of R12, a terminal of R13, and a terminal of R14.]

[11. The emergency power source according to claim 10, wherein a circuit (61) of the voltage identifying system comprises:

a dual operational amplifier U2 whose model is LM358, a three-terminal voltage regulator circuit U1 whose model is 7805, resistors R1, R2, R4, R5, R6, R7, R8, R9, R10 and R11, capacitors C1, C2, C3, C4, C5, C6, C7 and C8, schottky diodes D1 and D2 whose model are SS14, and a three-terminal adjustable shunt voltage reference U4 whose model is TL431; and wherein pin 1 of U2 is connected with a terminal of R5, a terminal of C5 and a terminal of C4, the other terminal of R5 is connected with a terminal of R6 and terminal IN1, the other terminal of R6 is grounded, pin 2 of U2 is connected to pin 5 of U2, a terminal of R11, a negative electrode of U4, a reference electrode of U4, and the other terminal of R16, the other terminal of R11 is connected to terminal VCC, pin 3 of U2 is connected with the other terminal of C5, a terminal of R1, a terminal of R7 and a terminal of R8, the other terminal of R1 is connected to the other terminal of C4, pin 4 of U2 is grounded with the other terminal of R7, a positive electrode of U4 and a terminal of R9, the other terminal of R8 is connected with a negative electrode of D2 and a terminal of R10, a positive electrode of D2 is connected to a positive electrode of BT2, pin 6 of U2 is connected with the other terminal of R10, the other terminal of R9, a terminal of C6 and a terminal of R2, pin 7 of U2 is connected with the other terminal of C6, a terminal of C7 and a terminal of R4, the other terminal of R4 is connected to node A, the other terminal of C7 is connected to the other terminal of R2, pin 8 of U2 is connected with a terminal of C8, a terminal of C2, a terminal of C3, pin 3 of U1 and terminal VCC, the other terminal of C8 is grounded, the other terminal of C2 is grounded with the other terminal of C3, pin 1 of U1 is connected with a terminal of C1 and a negative electrode of D1, pin 2 of U1 is grounded with the other terminal of C1, a positive electrode of D1 is connected to the positive electrode of BT1.]

[12. The emergency power source according to claim 11, wherein a circuit (63) of the relay comprises:

a three-terminal regulator chip U5 whose model is XC6219; resistors R3, R19 and R22; capacitors C11, C13 and C14; a schottky diode D5 whose model is SS14; a MCU controller chip J1; control switches Q1, Q2 and Q3 whose model are SI2300 and a relay; wherein pin 1 of U5 is connected with a terminal of C13, pin 3 of U5 and terminal VCC, pin 2 of U5 is grounded with the other terminal of C13, a terminal of C14, and pin 2 of J1, pin 4 of U5 is floating, pin 5 of U5 is connected with the other terminal of C14 and pin 1 of J1, pin 3 of J1 is connected to terminal IN1, pin 4 of J1 is connected to terminal OUT1, pin 5 of J1 is connected to terminal IN2, pin 6 of J1 is connected to terminal OUT2, pin 7 of J1 is floating, pin 8 of J1 is floating, terminal OUT1 is connected to a terminal of R3, the other terminal of R3 is connected to a gate of Q2, a drain of Q2 is connected to a source of Q3 and the other terminal of R13, a drain of Q3 is connected to the other terminal of R12, a gate of Q3 is connected to node A, a source of Q2 is connected with a source of Q1 and the other terminal of R14, a gate of Q1 is connected to a terminal of R19, the other terminal of R19 is connected to terminal OUT2, a drain of Q1 is connected with a positive electrode of D5 and a terminal of the coil of the relay, a negative electrode of D5 is connected with the other terminal of the coil of the relay, a terminal of a normally open contact of the relay, a terminal of R22, and a positive electrode of BT1, the other terminal of R22 is connected to a terminal of C11, the other terminal of C11 is connected with a terminal of the normally open contact of the relay and a positive electrode of BT2.]

*13. The emergency power source according to claim 3, wherein if the red and black power source clips are respectively connected to the positive and negative electrodes of the vehicle battery correctly, an output voltage of the vehicle battery obtained by the voltage identifying system is positive and ranges from value a to value b greater than the value a.*

*14. The emergency power source according to claim 13, wherein the value a is 6 to 24 V, and the value b is 9 to 30 V.*

*15. The emergency power source according to claim 13, wherein when the output voltage of the vehicle battery obtained by the voltage identifying system ranges from the value a to the value b and is positive, the coil of the relay receives an electrical signal so that the relay is closed to conduct electricity therethrough and an output terminal of the relay is coupled to the input terminal of the high current outputting circuit. the high current outputting circuit is switched on, and the emergency power source starts to power an external device with a high current.*

*16. The emergency power source according to claim 15, wherein the current identifying system is configured to detect a current flowing through the high current outputting circuit. and wherein if the current is lower than value c. the electrical signal received by the relay disappears so that the relay is open and the output terminal of the relay is disconnected from the high current outputting circuit to stop powering the vehicle battery with the high current.*

*17. The emergency power source according to claim 16, wherein the high current outputting circuit has an output voltage of 12V DC or 24V DC, and an instantaneous current ranging from 100 A to 600 A.*

*18. The emergency power source according to claim 16, wherein the value c ranges from 0.1 A to 10 A.*

*19. The emergency power source according to claim 1, further comprising a LED lighting lamp to provide lighting and a LED driving circuit coupled between the battery pack and the LED lighting lamp to drive the LED lighting lamp.*

*20. The emergency power source according to claim 1, further comprising a smart heating system configured to heat the battery pack, wherein the smart heating system comprises a thermistor attached to an outside of the battery pack.*

*21. The emergency power source according to claim 1, further comprising a micro controller operably connected to the voltage identifying system and the current identifying system to output at least one micro controller output signal associated with the ON state or the OFF state of the relay.*

*22. The emergency power source according to claim 21, further comprising a first control switch directly connected to a terminal of the coil of the relay, wherein the first control switch is coupled in communication with the micro controller to receive a first signal associated with the at least one micro controller output signal.*

*23. The emergency power source according to claim 21, wherein*

*the current identifying system is configured to detect whether the emergency power source is disconnected from the vehicle battery; and*

*the micro controller is configured to receive an input signal in response to detecting, by the current identifying system that the emergency power source is disconnected from the vehicle battery.*

*24. The emergency power source according to claim 21, further comprising a second control switch coupled in communication with the micro controller to receive a second signal associated with the at least one micro controller output signal, wherein the second signal is associated with the ON and OFF state of the relay.*

*25. The emergency power source according to claim 24, wherein the micro controller output signal associated with the second signal is determined based on an input from the voltage identifying system to the micro controller.*

*26. The emergency power source according to claim 21, wherein the voltage identifying system is coupled to:*

*(1) a positive electrode of the battery pack to receive a voltage input to detect whether an output voltage of the battery pack is below a threshold, and*

*(2) the micro controller. such that the micro controller receives an input signal from the voltage identifying*

*system in response to detecting, by the voltage identifying system. that the output voltage of the battery pack is below the threshold.*

*27. The emergency power source according to claim 21, wherein the voltage identifying system comprises a comparator, and wherein the comparator has:*

*a first input coupled to a negative electrode of the vehicle battery to receive a voltage input,*

*a second input receiving a reference voltage, and*

*an output coupled to the micro controller such that the micro controller receives an input signal from the voltage identifying system in response to detecting by the comparator, that the voltage input is lower than the reference voltage.*

*28. The emergency power source according to claim 21, further comprising a third control switch coupled to receive a third signal from the voltage identifying system, wherein the third signal is associated with the ON and OFF state of the relay.*

*29. The emergency power source according to claim 28, wherein the voltage identifying system is coupled to:*

*(1) a positive electrode of the vehicle battery to receive a voltage input in response to detecting. by the voltage identifying system, that an output voltage of the vehicle battery exceeds a threshold, and*

*(2) the third control switch, such that the third control switch receives an input signal from the voltage identifying system in response to detecting, by the voltage identifying system. that the output voltage of the vehicle battery exceeds the threshold.*

*30. The emergency power source according to claim 28, wherein the voltage identifying system comprises a comparator, and wherein the comparator has:*

*a first input coupled to a positive electrode of the vehicle battery to receive a voltage input,*

*a second input receiving a reference voltage, and*

*an output coupled to the third control switch such that the third control switch receives an input signal from the voltage identifying system in response to detecting, by the comparator, that the voltage input is higher than the reference voltage.*

*31. The emergency power source according to claim 21, further comprising a first control switch, a second control switch, and a third control switch, wherein:*

*the first control switch is directly connected to a terminal of the coil of the relay and also coupled to receive from the micro controller a first signal associated with a first micro controller output signal of the at least one micro controller output signal,*

*the second control switch is coupled to receive from the micro controller a second signal associated with a second micro controller output signal of the at least one micro controller output signal,*

*the third control switch is coupled to receive from the voltage identifying system a third signal,*

*the first signal, the second signal, and the third signal are associated with the ON and OFF state of the relay, and*

*the second control switch and the third control switch are connected to the coil of the relay via the first control switch.*

*32. The emergency power source according to claim 31, wherein the voltage identifying system comprises an amplifier including a first comparator and a second comparator,*

*the first comparator has a first input coupled to a negative electrode of the vehicle battery to receive a voltage input, a second input receiving a reference voltage, and an output coupled to the micro controller such that the micro controller receives an input signal from the voltage identifying system in response to detecting, by the first comparator, that the output voltage of the vehicle battery is below a first threshold, and*

*the second comparator has a first input receiving the reference voltage, a second input coupled to a positive electrode of the vehicle battery to receive a voltage input, and an output coupled to provide a signal to the third control switch in response to detecting, by the second comparator, that the output voltage of the vehicle battery exceeds a second threshold that is higher than the first threshold.*

*33. The emergency power source according to claim 31, wherein*

*the current identifying system is configured to detect whether the emergency power source is disconnected from the vehicle battery; and*

*the micro controller is configured to receive an input signal in response to detecting, by the current identifying system, that the emergency power source is disconnected from the vehicle battery.*

*34. The emergency power source of claim 21. wherein the current identifying system comprises:*

*an amplifier having a plurality of pins including a first pin a second pin, a third pin, a fourth pin, and a fifth pin,*

*a plurality of resistors including a first resistor, a second resistor, a third resistor, a fourth resistor, a fifth resistor, a sixth resistor and a seventh resistor,*

*a plurality of capacitors including a first capacitor and a second capacitor,*

*a switching diode having a positive electrode and a negative electrode,*

*the first pin of the amplifier is connected with a terminal of the first resistor, a terminal of the second resistor, and a terminal of the third resistor,*

*the second pin of the amplifier is connected with a terminal of the first capacitor, a terminal of the fourth resistor, and a negative electrode of the vehicle battery,*

*the third pin of the amplifier is connected with a terminal of the fifth resistor, a second terminal of the third resistor, and the positive electrode of the switching diode, a second terminal of the fifth resistor is connected to a second terminal of the first capacitor,*

*the fourth pin of the amplifier is connected with terminal VCC and a terminal of the second capacitor, and*

*the negative electrode of the switching diode is connected to a terminal of the sixth resistor, a second terminal of the sixth resistor is connected with a terminal of the seventh resistor and a terminal of the micro controller.*

*35. The emergency power source according to claim 4, further comprising: a micro controller that is coupled to the voltage identifying system and the current identifying system and configured to output at least one micro controller output signal relating to the ON state or the OFF state of the relay.*

*36. The emergency power source according to claim 35, further comprising a first control switch, a second control switch, and a third control switch, wherein:*

*the first control switch is directly connected to a terminal of the coil of the relay and also coupled to receive from the micro controller a first signal associated with a first micro controller output signal of the at least one micro controller output signal,*

*the second control switch is coupled to receive from the micro controller a second signal associated with a second micro controller output signal of the at least one micro controller output signal,*

*the third control switch is coupled to receive from the voltage identifying system a third signal,*

*the first signal, the second signal, and the third signal are associated with the ON and OFF state of the relay, and*

*the second control switch and the third control switch are connected to the coil of the relay via the first control switch.*

*37. The emergency power source according to claim 4, further comprising a second micro controller that is coupled to at least one of a path of the multipath DC-DC voltage regulator circuit, and a smart LED electric quantity display system for displaying the electric quantity of the emergency power source.*

*38. An emergency power source, comprising:*

*a housing, the housing having at its inside a battery pack, wherein the battery pack is configured to store electric energy and to be connected to a high current ouputting circuit configured to output a high current for starting a vehicle or charging an external battery, and wherein the battery pack is configured to be charged by an external power source via a charging circuit or by solar energy via a solar panel input circuit disposed outside of the housing, and*

*a smart battery detection system connected between the battery pack and a vehicle battery of the vehicle, the smart battery detection system comprising:*

*a red power source clip and a black power source clip configured to be connected with the vehicle battery,*

*a voltage identifying system comprising a circuit for identifying a voltage of the vehicle battery or the battery pack, wherein the circuit of the voltage identifying system comprises a first amplifier,*

*a current identifying system comprising a circuit for identifying a current flowing through an external starting circuit, wherein the circuit of the current identifying system comprises a second amplifier, and*

*a relay switchable between an ON state and an OFF state according to a detection signal that relates to the identified voltage or the identified current, wherein*

*two terminals of a coil of the relay are connected to the voltage identifying system, an input terminal of the relay is connected to the current identifying circuit, an output terminal of the relay is connected to the high current outputting circuit,*

*the red and black power source clips are connected to positive and negative electrodes of the battery pack through a reverse-insertion-proof connector or welded wires, and*

*the voltage identifying system is connected to the red and black power source clips,*

*a micro controller coupled to the voltage identifying system and the current identifying system to receive an input associated with the identified voltage or the identified current,*

*a first control switch coupled to (1) the micro controller to receive a first output signal from the micro controller, and (2) a terminal of the coil of the relay to provide a first electrical signal to the terminal of the coil of the relay in response to the first output signal, and*

*a second control switch coupled to (1) the micro controller to receive a second output signal from the micro controller, and (2) the terminal of the coil of the relay, via the first control switch.*

*39. An emergency power source comprising:*

*a housing, the housing having at its inside a battery pack, wherein the battery pack is configured to store electric energy and to be connected to a high current outputting circuit configured to output a high current for starting a vehicle or charging an external battery, wherein the battery pack is configured to be charged by an external power source via a charging circuit or by solar energy via a solar panel input circuit disposed outside of the housing, and*

*a smart battery detection system connected between the battery pack and the high current outputting circuit, the smart battery detection system comprising*

*a red power source clip and a black power source clip configured to be connected with, and to transfer electric power from the battery pack to, the external battery to be charged or the vehicle to be jump started,*

*a voltage identifying system comprising a circuit for identifying a voltage of the external battery or the battery pack,*

*a current identifying system comprising a circuit for identifying a current flowing through an external starting circuit, wherein the circuit of the current identifying system comprises an amplifier,*

*a relay switchable between an ON state and an OFF state according to a detection signal that relates to the identified voltage or the identified current, the relay comprising a coil operable to set the relay between the ON state and the OFF state,*

*one or more circuit switches coupled to the coil of the relay to control electric power to the coil of the relay, and*

*a microcontroller unit coupled to the voltage identifying system and to the one or more circuit switches to control the relay in response to a signal from the voltage identifying system indicating a status of the external battery or the battery pack, wherein*

*two terminals of the coil of the relay are connected to the voltage identifying system, one of the two terminals of the coil is directly connected to an electrode of the battery pack, an input terminal of the relay is connected to the current identifying system, an output terminal of the relay is connected to the high current outputting circuit,*

*the red and black power source clips are connected to positive and negative electrodes of the battery pack through a reverse-insertion-proof . connector or welded wires, and the voltage identifying system is connected to the red and black power source clips.*

*40. The emergency power source according to claim 39, wherein the microcontroller unit is operable to control the one or more circuit switches to cause the relay to be in the OFF state when a connection between the red and black power source clips to the external battery to be charged or the vehicle to be jump started are reverse connections.*

*41. The emergency power source according to claim 39, wherein the one or more circuit switches are connected in series to one terminal of the coil of the relay.*

*42. The emergency power source according to claim 39, further comprising:*

*a DC-DC buck circuit coupled to receive electric power from the battery pack to output a low DC voltage output for charging an external device at the low DC voltage output; and*

*a DC-DC booster circuit coupled to receive electric power from the battery pack to output a high DC voltage output for charging an external device at the high DC voltage output.*

*43. The emergency power source according to claim 42, further comprising:*

*an inverter circuit coupled to receive electric power from the battery pack to output an alternating current output.*

*44. The emergency power source according to claim 39, further comprising:*

*an LED driving circuit coupled to receive electric power from the battery pack; and*

*an LED lighting lamp coupled to receive power from the LED driving circuit to provide light output for illumination.*

*45. The emergency power source according to claim 39, further comprising:*

*a thermistor coupled to the battery pack to measure a temperature of the battery pack;*

*a heater engaged to receive electric power from the battery pack to heat the battery pack in response to a microcontroller unit control signal based on the measured temperature by the thermistor with respect to a temperature range for the battery pack.*

*46. The emergency power source according to claim 39, wherein the microcontroller unit is operable to control one of the one or more circuit switches that in turn controls the relay based on a signal from the current identifying system.*

*47. An emergency power source comprising*

*a housing, the housing having at its inside a battery pack configured to store electric energy, wherein the battery pack includes*

*input terminals configured to be connected to a charging circuit for receiving the electric energy from an external power source and to a solar panel input circuit outside the energy power source for receiving the electric energy from solar energy, and*

*output terminals configured to be connected to a high current outputting circuit configured to output a high current for starting a vehicle,*

*a smart battery detection system connected between the battery pack and the high current outputting circuit, the smart battery detection system comprising*

*a red power source clip and a black power source clip configured to be connected with a vehicle battery of the vehicle,*

*a voltage identifying system including a circuit for identifying a voltage of the vehicle battery or the battery pack,*

*a current identifying system including a circuit for identifying a current flowing through an external starting circuit, and*

*a relay switchable between an ON state and an OFF state according to a detection signal that relates to the identified voltage or the identified current, the relay comprising a coil, wherein*

*two terminals of the coil of the relay are connected to the voltage identifying system, one of the two terminals of the coil is directly connected to an electrode of the battery pack. an input terminal of the relay is connected to the current identifying system, an output terminal of the relay is connected to the high current outputting circuit, and*

*the red and black power source clips are connected to positive and negative electrodes of the battery pack, the voltage identifying system is connected to the red and black power source clips.*

*48. An emergency power source comprising*

*a housing, the housing having at its inside a battery pack configured to store electric energy, wherein the battery pack is configured to be charged by an external power source by connecting to a charging circuit or by solar energy by connecting to a solar panel input circuit disposed outside of the housing, and output terminals of the battery pack are configured to be connected to a high current outputting circuit configured to output a high current for starting a vehicle,*

*a smart battery detection system connected between the battery pack and the high current outputting circuit. the smart battery detection system comprising*

*a red power source clip and a black power source clip configured to be connected with a vehicle battery of the vehicle,*

*a voltage identifying system including a circuit for identifying a voltage of the vehicle battery or the battery pack,*

*a current identifying system including a circuit for identifying a current flowing through an external starting circuit, and*

*a relay switchable between an ON state and an OFF state according to a detection signal that relates to the identified voltage or the identified current, the relay comprising a coil, wherein*

*two terminals of the coil of the relay are connected to the voltage identifying system. one of the two terminals of the coil is directly connected to an electrode of the battery pack, an input terminal of the relay is connected to the current identifying system, an output terminal of the relay is connected to the high current outputting circuit, and*

*the red and black power source clips are connected to positive and negative electrodes of the battery pack, the voltage identifying system is connected to the red and black power source clips.*

* * * * *